(12) United States Patent
Tordera

(10) Patent No.: US 7,756,547 B2
(45) Date of Patent: *Jul. 13, 2010

(54) SET UP LOGIC FOR DUAL INTERFACE WIRELESS IP COMMUNICATION DEVICE

(75) Inventor: Virgil Flores Tordera, Chula Vista, CA (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 1101 days.

This patent is subject to a terminal disclaimer.

(21) Appl. No.: 10/909,580

(22) Filed: Aug. 2, 2004

(65) Prior Publication Data

US 2005/0002367 A1     Jan. 6, 2005

Related U.S. Application Data

(63) Continuation of application No. 09/839,060, filed on Apr. 20, 2001, now Pat. No. 6,889,058.

(51) Int. Cl.
*H04B 1/38*     (2006.01)
*H04B 1/034*     (2006.01)

(52) U.S. Cl. ...................... 455/557; 455/418

(58) Field of Classification Search .............. 455/557, 455/558, 418–420; 719/319, 321–327
See application file for complete search history.

(56) References Cited

U.S. PATENT DOCUMENTS

| | | | | |
|---|---|---|---|---|
| 5,227,614 | A | * | 7/1993 | Danielson et al. ............ 235/380 |
| 6,757,904 | B1 | * | 6/2004 | Woodruff et al. ............ 719/319 |
| 6,889,058 | B2 | * | 5/2005 | Tordera ....................... 455/557 |

* cited by examiner

*Primary Examiner*—Philip J Sobutka
(74) *Attorney, Agent, or Firm*—John L. Rogitz

(57) ABSTRACT

A communication interface device includes a wireless Internet packet (IP) transceiver and a PCMCIA card electrically connected to the transceiver. Also, a universal serial bus (USB) connector is plugged into a hub that holds the PCMCIA card, with a cord extending from the USB connector and terminating in another USB connector. Accordingly, the device can be engaged with the PCMCIA bay of a user terminal or, if a user terminal has no PCMCIA bay, with a USB receptacle of the user terminal, to establish wireless communication. To simplify set-up, a CD containing all operating system versions of PCMCIA and USB drivers is engaged with the user terminal. The terminal's operating system is then automatically determined, and only the drivers associated with that operating system are loaded onto the terminal.

3 Claims, 3 Drawing Sheets

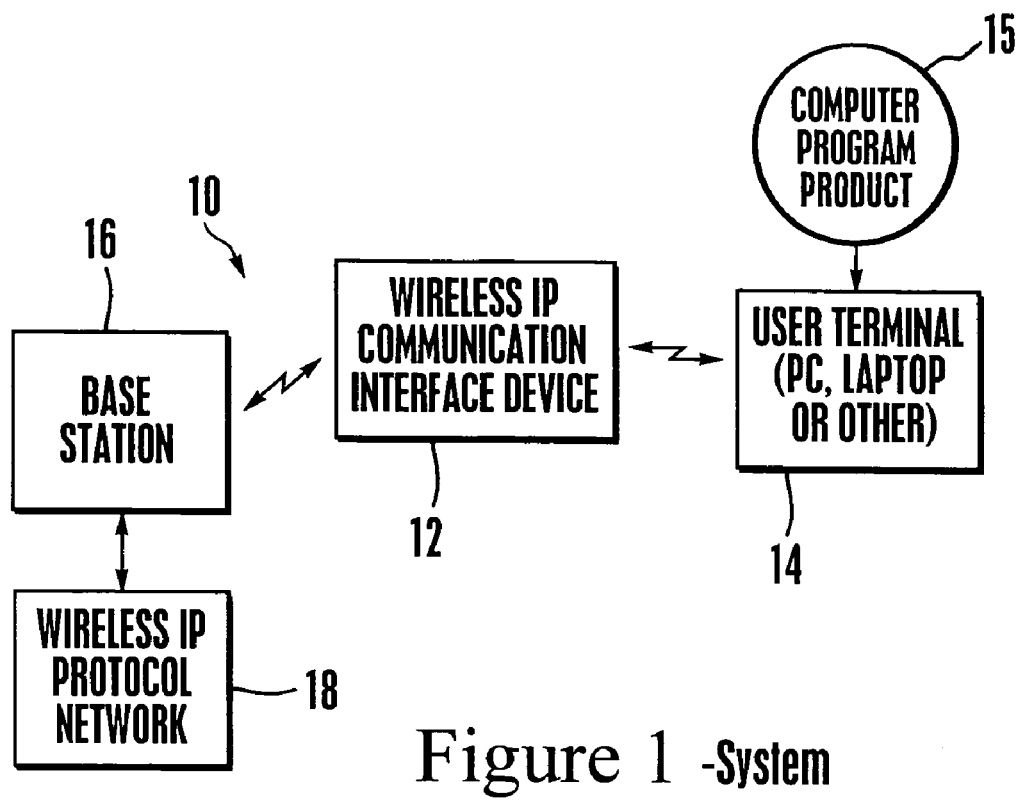
Figure 1 -System
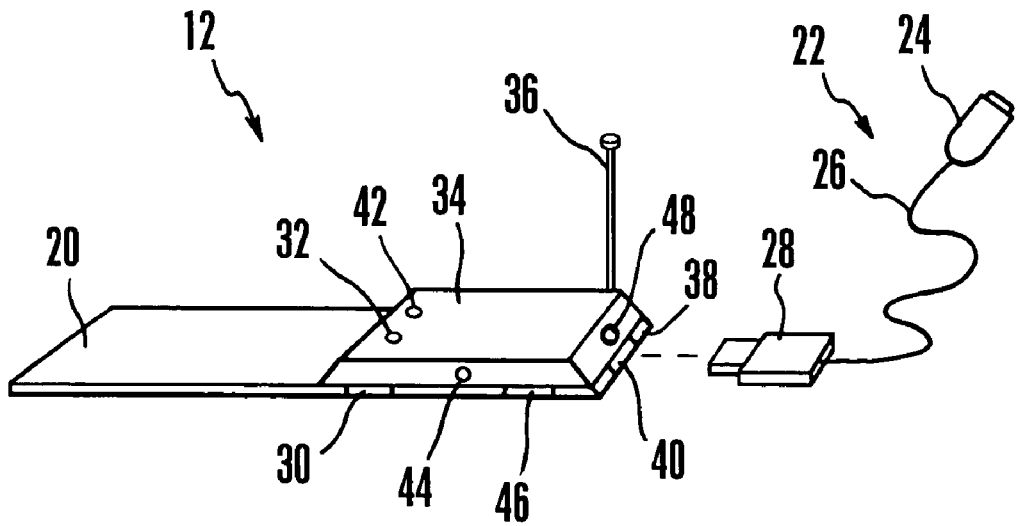
Figure 2 -Wireless IP communication interface device

SET UP LOGIC FOR DUAL INTERFACE WIRELESS IP COMMUNICATION DEVICE

This is a continuation of U.S. patent application Ser. No. 09/839,060, filed Apr. 20, 2001, now U.S. Pat. No. 6,889,058, from which priority is claimed.

BACKGROUND OF THE INVENTION

1. Field of the Invention

The present invention relates generally to wireless Internet Packet (IP) communication devices having more than one interface format.

2. Description of the Related Art

Networked computing is a powerful tool for business and personal use. With it, the user of a user terminal that communicates with a network such as a company's local area network (LAN) or a wide area network (WAN) can access and share data with other terminals in the network.

Most LAN/WANs are implemented by wired connections, i.e., by requiring that the computers in a network be attached to the network by means of wires. For convenience and to permit easy movement of user terminals within the Network, wireless Networks have been introduced, in which network communication is established via a wireless radiofrequency (rt) or infrared (IR) link.

As recognized by the present assignee, a wireless communication interface can be established by connecting an interface component to a user terminal such as a laptop computer or personal computer. Once connected, the interface component can be used to transfer data via the wireless link between the user terminal and the network. As also recognized by the present assignee, an interface component must be mechanically configured to engage the user terminal and electrically configured to communicate via the particular wireless link being used. Unfortunately, some potentially preferred interface components, such as personal computer memory card interface architecture (PCMCIA) cards which are configured for engaging a PCMCIA slot in a laptop computer, might not be engageable with PCs without a PCMCIA card adaptor, because many PCs do not have PCMCIA slots. Accordingly, we observe that a separate interface component that would include a mechanical connection such as a PCMCIA card adaptor or a universal serial bus (USB) connector would be required to interface such PCs with the wireless link.

Moreover, while two mechanical connections defining two respective interface formats might be required to link two differently-configured user terminals to a network, many of the electrical components that support wireless link communication would remain the same for each terminal. Thus, making separate interface devices for each type of user terminal in the network is wasteful since common communication components would have to be duplicated in separate devices. This increases manufacturing costs and requires a user of both a network laptop and a network PC to purchase and use separate interface devices, one for each of his network terminals.

To address the above-noted issues, a dual interface device has been disclosed in co-pending U.S. patent application Ser. No. 09/833,489, filed Apr. 12, 2001. The present invention recognizes that for such a dual interface device, each interface requires a respective software driver tailored to the particular operating system of the computer sought to be used. Accordingly, the correct drivers must first be loaded into the computer, but as recognized herein this requires the user to be sufficiently proficient to know what operating system (and perhaps even what version of the operating system) happens to be loaded onto the computer. Unfortunately, not all users know what operating system is used by their computer. Furthermore, software drivers are typically provided on compact disks (CDs). This means that to load the drivers for the dual interface device, a CD must be engaged with the computer. However, the present invention understands that certain computers, e.g., some types of laptop computers, have only a single PCMCIA slot to which a CD must be connected when it is desired to establish communication between the CD and computer, thereby preventing simultaneous use of the PCMCIA slot for a dual interface device that might use the PCMCIA form factor to access the appropriate driver on a CD. Having recognized the above-noted problem, the present invention provides the solution disclosed herein.

SUMMARY OF THE INVENTION

A method is disclosed for enabling a user terminal to use a communication interface device that has a personal computer memory card interface architecture (PCMCIA) interface and a universal serial bus (USB) interface without requiring the user to know the type of operating system used by the terminal or the type of driver that is needed. The method includes engaging a storage device with the user terminal, with the storage device containing plural PCMCIA drivers and plural USB drivers. Each driver is associated with a respective operating system. The method then automatically determines the type of operating system of the user terminal, and automatically loads a PCMCIA driver and a USB driver onto the user terminal in response. Wireless Internet packet (IP) communication can then be undertaken using the drivers.

In one preferred embodiment, a user set-up prompt can be provided to the user. Also, if desired a driver directory can be automatically defined. Diagnostic monitoring can also be undertaken after the drivers are loaded. In any case, the acts of determining and loading do not require user input regarding a type of operating system on the user terminal.

In another aspect, a computer program product that can be engaged with a user terminal includes plural first communication interface driver means and plural second communication interface driver means. Each driver means is correlated to a respective operating system. Logic means are provided for determining a type of operating system used by the terminal. Also, logic means that are responsive to the means for determining provide at least one first communication interface driver means and at least one second communication interface driver means to the user terminal.

In yet another aspect, a user terminal is disclosed for providing wireless IP communication using an interface device having at least first and second communication interfaces. The terminal includes an operating system and a computer program that determines the type of the operating system without receiving any user input indicating the type. In response, the program automatically loads first and second device drivers associated with the first and second communication interfaces without any user input regarding driver types.

The details of the present invention, both as to its structure and operation, can best be understood in reference to the accompanying drawings, in which like reference numerals refer to like parts.

BRIEF DESCRIPTION OF THE DRAWINGS

FIG. 1 is a schematic diagram showing the system architecture of the present invention;

FIG. 2 is an exploded perspective view of a preferred wireless IP communication interface device;

DETAILED DESCRIPTION OF THE PREFERRED EMBODIMENTS

Figure 3:
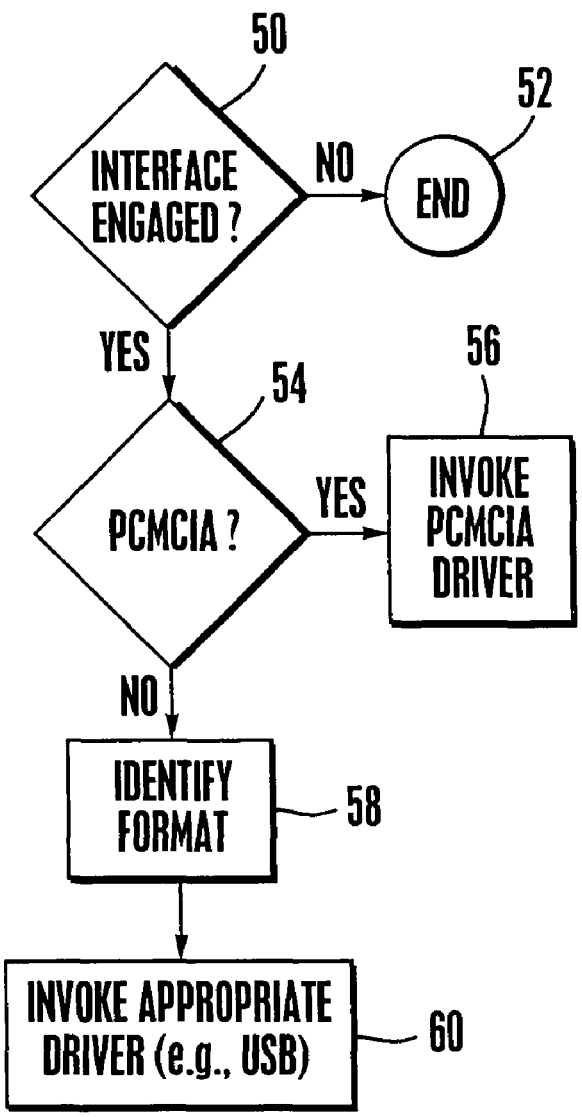
FIG. 3 is a flow chart showing the logic for invoking the appropriate device driver.

Referring initially to FIG. 1, a system is shown, generally designated 10, that includes a communication interface device 12 engageable with a user terminal 14 potentially having access to a computer program product 15 for establishing wireless communication between the terminal 14 and a base station 16 of a wireless network 18. In one non-limiting embodiment used only for illustration purposes, the network 18 can have a broadband Internet packet (IP) data protocol, such as an i-Burst network made by Arraycomm. Such a network can use space division multiple access (SDMA) directional communication principles and has a data transfer rate in excess of one megabyte per second. The program product 15 can be any suitable device, such as but not limited to a CD-ROM, floppy disk, etc. As set forth further below in reference to FIG. 5, the device 15 can contain logic including device drivers that are to be made available to the terminal 14.

FIG. 2 shows one preferred embodiment of the interface device 12. As shown, the device 12 can include a first computer communication interface component, such as a PCMCIA card 20, which defines a first interface format. Also, the device 12 includes a second computer communication interface component such as a universal serial bus (USB) connector 22 which defines a second interface format. In one preferred embodiment, the USB connector 22 includes a male USB "A" plug 24 having two rows of pins (five pins in one row and four in the other row), with the USB "A" plug 24 being connected via a cord 26 to a USB "B" plug 28. The USB plugs 24, 28 are preferably in accordance with USB 2.0. In alternate embodiments, the second computer communication interface component can be established by a so-called "ILink" connection in accordance with IEEE standard 1394 or even a wireless component such as a so-called "Bluetooth" rf communication device.

In any case, as intended by the present invention both computer communication interface components are electrically associated with a transceiver 30, such as a wireless IP transceiver provided by Arraycomm. Such a transceiver operates in a frequency range of between nine kiloHertz to fifty gigaHertz (9 kHz-50 gHz) and more preferably in a range between two thousand three hundred million Hertz and two thousand three hundred ten million Hertz (2300 mHz-2310 mHz). It is to be understood that the transceiver 30 can be integral to the PCMCIA card 20. The transceiver 30 with PCMCIA card 20 establish a housing 32 that can include a raised hub 34 detachably supporting a preferably directional antenna 36.

As shown in FIG. 2, a USB "B" receptacle 38 is formed in the hub 34. Accordingly, the USB "B" plug 28 of the USB connector 22 is configured for mechanically and electrically engaging the receptacle 38. Thus, the USB connector 22 is detachably engaged with the housing 32, but a non-detachable connection can also be used. According to present principles, the transceiver 30 is associated with the antenna 36, such that both computer communication interface components are electrically connected to the antenna 36. It may now be appreciated that the PCMCIA card 20 can be engaged with a PCMCIA slot of the user terminal 14 to establish wireless communication between the user terminal 14 and the base station 16 using the first interface format, or, if no PCMCIA slot is available, the USB "A" plug 24 can be engaged with a USB receptacle of the user terminal 14 to establish wireless communication between the user terminal 14 and the base station 16 using the second interface format.

FIG. 2 shows that if desired, a rechargeable battery 40 can be included with the housing 32. Also, one or more light emitting diodes (LED) 42 can be mounted on the housing 34 to indicate whether the transceiver 30 is communicating with the base station 16, and/or to indicate a low voltage condition of the battery, and/or to indicate other events such as power on and so on. Still further, a small audio speaker or beeper 44 can be mounted on the housing to indicate these same or different conditions. It is to be understood that the user terminal 14 can alternatively provide such audible and/or visual indications.

To provide for recharging the battery 40, a charger port 46 configured for receiving a charger plug (not shown) can be formed in the housing and electrically connected to the battery 40. To conserve battery power, a power switch 48 can be provided on the housing 32 and electrically connected to the battery 40 so that a user can selectively connect and disconnect the battery 40 from the remainder of the components in the housing 32.

The chipsets, firmware, or software of the user terminal 14 are configured for operating with the interface device 12. The flow charts herein illustrate the structure of a logic device of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. Internal logic could be as simple as a state machine.

In other words, the present logic may be established as a computer program that is executed by a processor as a series of computer-executable instructions. In addition to residing on hard disk drives, these instructions may reside, for example, in RAM of the appropriate computer, or the instructions may be stored on magnetic tape, electronic read-only memory, or other appropriate data storage device.

FIG. 3 shows that the user terminal 14 can determine, at decision diamond 50, whether the interface device 12 is engaged with the terminal 14. If not, the logic ends at state 52, but otherwise the logic flows to decision diamond 54 to determine whether the PCMCIA card 20 has been engaged with a PCMCIA port on the terminal 14. Of course, for terminals that have no PCMCIA port, the step at decision diamond 54 is skipped.

When it is determined that the PCMCIA card 20 has been engaged with the terminal 14, a PCMCIA software driver module is invoked at state 56. On the other hand, when it is determined that the device 12 is engaged with the terminal 14 but not via a PCMCIA connection, the logic flows to block 58 to identify the format (e.g., USB) and thence to block 60 to invoke the appropriate software driver module.

Figure 4:
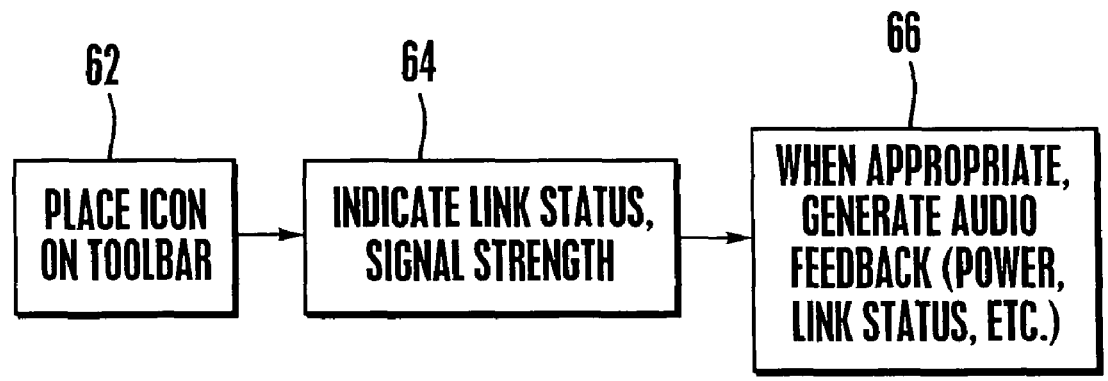
FIG. 4 is a flow chart showing the operating logic of the system.

Once the interface device 12 has been engaged with the user terminal 14, the logic of FIG. 4 can be invoked. Commencing at block 62, an icon representing the device 12 can be placed on the toolbar of the display of the user terminal 14. As mentioned above, at block 64 the display of the terminal 14 can indicate link status, battery 40 status, device 12 power on status, link signal strength, and so on. Audible feedback of these parameters can also be provided by the user terminal 14 at block 66.

Figure 5:
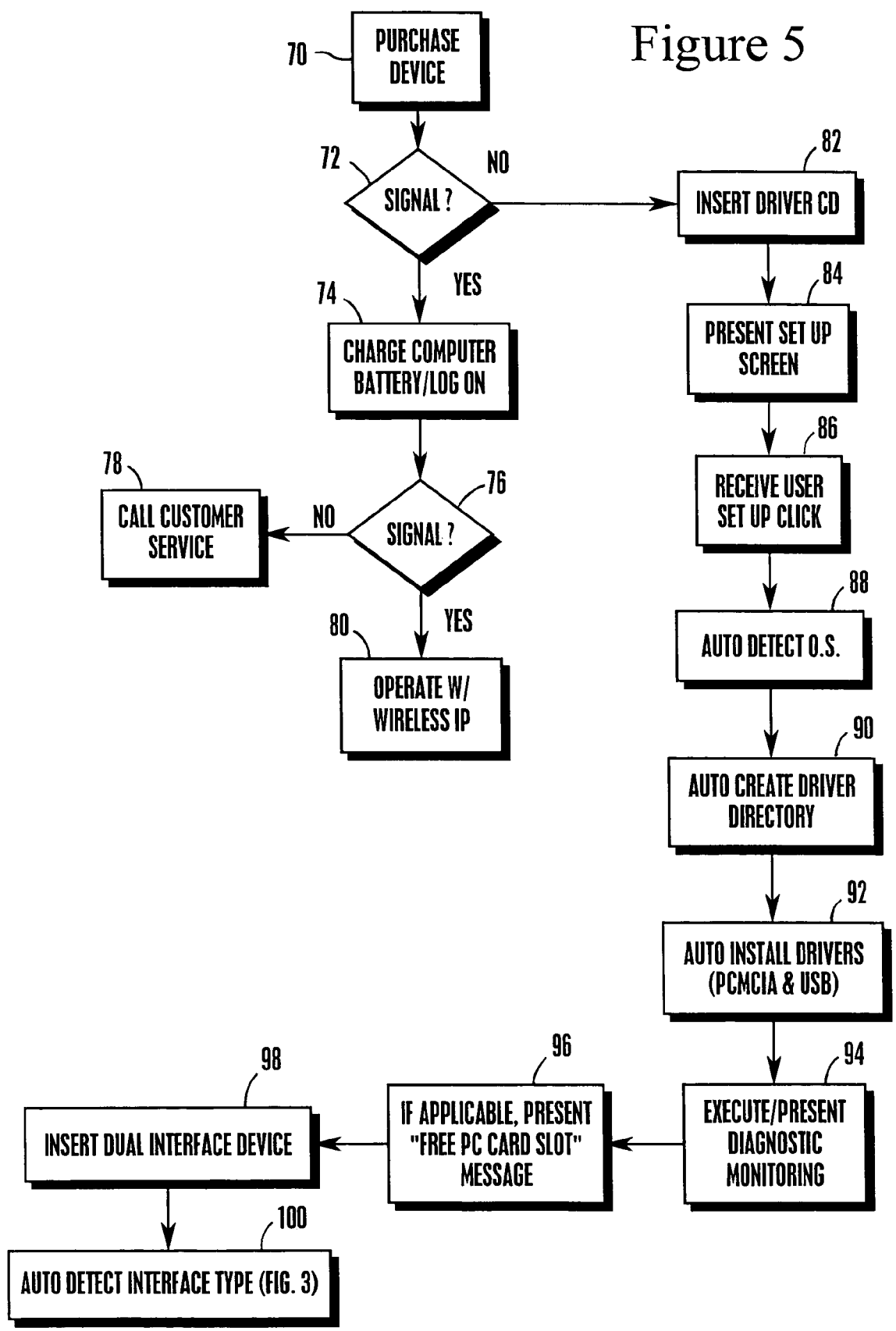
FIG. 5 is a flow chart showing the set up logic of the system.

FIG. 5 shows the set up logic of the present system. Commencing at block 70, the above-described dual interface device 12 is obtained. Moving to decision diamond 72 it is determined, with the device 12 installed in the user terminal 14, whether a wireless IP signal is being received at the user terminal 14. After the below-described driver installation, it is expected that a positive test will be obtained at decision diamond 72, in which case the logic proceeds to block 74 to undertake routine computer housekeeping functions, e.g., battery charges, logging on, etc. The test for whether a signal is maintained can be repeated at decision diamond 76, and if persistent signal loss occurs the user can be prompted to contact system 10 customer service at block 78. Otherwise, the user can operate the user terminal 14 in accordance with the logic of FIG. 4 above.

In contrast, prior to loading software drivers for the two interfaces onto the user terminal 14, the test at decision diamond 82 will be negative, in which case the logic flows to block 82 wherein a CD such as the program product 15 (FIG. 1) containing all necessary drivers preferably for all operating systems is engaged with the user terminal 14, if necessary using a PCMCIA slot in accordance with principles known in the art. Then, a set up screen can be presented at block 84 which preferably has a simple prompt, such as "load drivers now?" The resulting user input to commence the load process is received at block 86.

In accordance with the present invention, the logic then proceeds to block 88, to automatically detect what operating system is present on the user terminal 14. This can be undertaken in any one of a number of ways, such as by scanning an operating system file header or by some other method.

In any case, once the type of operating systems has been detected, the logic creates a dual interface device driver directory at block 90, and then at block 92 the PCMCIA and USB drivers from the CD are copied into the directory. The CD preferably contains all PCMCIA and USB drivers for all anticipated operating systems, but in a preferred embodiment only the PCMCIA driver and USB driver that are tailored for the operating system detected at block 88 are copied into the driver directory at block 92. It may now be appreciated that owing to the present logic, the user is not required to know what operating system is used by the user terminal 14 or to know what particular drivers must be loaded into the driver directory.

If desired, certain terminal diagnostic monitoring can be executed and results presented at block 94 to indicate, e.g., whether the drivers were successfully loaded onto the user terminal 14. If the user terminal 14 has only a single PCMCIA slot by which the CD is connected to the terminal, a user prompt to remove the CD from the slot can be presented on the display of the terminal 14 at block 96. The dual interface device 12 is then engaged with the user terminal 14 at block 98 in accordance with the disclosure above, and the operating logic of FIG. 3 invoked at block 100.

While the particular SET UP LOGIC FOR DUAL INTERFACE WIRELESS IP COMMUNICATION DEVICE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A user terminal for providing wireless IP communication using an interface device having at least first and second communication interfaces, comprising:
    at least one operating system; and
    a computer program determining a type of the operating system without receiving any user input indicating the type and in response automatically loading at least first and second device drivers associated with the first and second communication interfaces without any user input regarding driver types, the program determining which interface is engaged with the terminal and in response selecting which of the drivers to invoke.

2. The terminal of claim 1, wherein the program automatically establishes a device directory using the operating system prior to loading the drivers.

3. The terminal of claim 2, wherein the program provides a user set-up prompt to the user.

\* \* \* \* \*